United States Patent [19]

Hirmänn

[11] Patent Number: 4,615,258
[45] Date of Patent: Oct. 7, 1986

[54] DRIVE DEVICE OPERATED BY A PRESSURE FLUID

[76] Inventor: Georg Hirmänn, Griesernweg 14, 8037 Zürich, Switzerland

[21] Appl. No.: 616,228
[22] PCT Filed: Sep. 5, 1983
[86] PCT No.: PCT/CH83/00101
§ 371 Date: May 15, 1984
§ 102(e) Date: May 15, 1984
[87] PCT Pub. No.: WO84/01199
PCT Pub. Date: Mar. 29, 1984

[30] Foreign Application Priority Data

Sep. 17, 1982 [CH] Switzerland ............ 5500/82

[51] Int. Cl.⁴ .................................. F16H 25/18
[52] U.S. Cl. ................................. 92/40; 92/92; 92/94; 92/129; 92/103 F; 74/126; 226/164
[58] Field of Search ........... 92/28, 27, 40, 92, 91, 92/94, 129, 90, 89, 34, 37, 48, 103, 103 F; 226/162, 163, 164, 165, 166; 74/128, 126

[56] References Cited

U.S. PATENT DOCUMENTS

| | | | |
|---|---|---|---|
| 615,717 | 12/1898 | Knapp | 92/92 |
| 862,867 | 8/1907 | Eggleston | 92/40 |
| 2,226,201 | 12/1940 | Freysswet | 92/92 |
| 2,445,862 | 7/1948 | Price | 92/90 |
| 2,644,336 | 7/1953 | Bowditch | 92/91 |
| 3,494,529 | 2/1970 | Beattie | 226/165 |
| 3,575,330 | 4/1971 | Sniderman | 226/164 |
| 3,642,186 | 2/1972 | Nemeth | 226/164 |
| 4,182,150 | 1/1980 | Greven | 226/166 |

FOREIGN PATENT DOCUMENTS

| | | |
|---|---|---|
| 569894 | 2/1933 | Fed. Rep. of Germany. |
| 1259301 | 5/1969 | Fed. Rep. of Germany. |
| 2092367 | 1/1972 | France. |
| 2104756 | 4/1972 | France. |
| 1005616 | 9/1965 | United Kingdom. |
| 1048457 | 11/1966 | United Kingdom ......... 226/165 |

Primary Examiner—Robert E. Garrett
Assistant Examiner—Richard S. Meyer
Attorney, Agent, or Firm—Ostrolenk, Faber, Gerb & Soffen

[57] ABSTRACT

In a drive device operated by pressure fluid a progressive linear or swinging or rotary movement of a driven element is produced by means of at least one lifting element. Between the lifting element and the driven element there is arranged at least one wedge which carries out a stepwise reciprocating movement under the influence of the lifting element. In this way the driven element is pushed forward step by step in the loaded direction via a force locking. This drive device permits a force-locked connection to the object to be moved.

13 Claims, 15 Drawing Figures

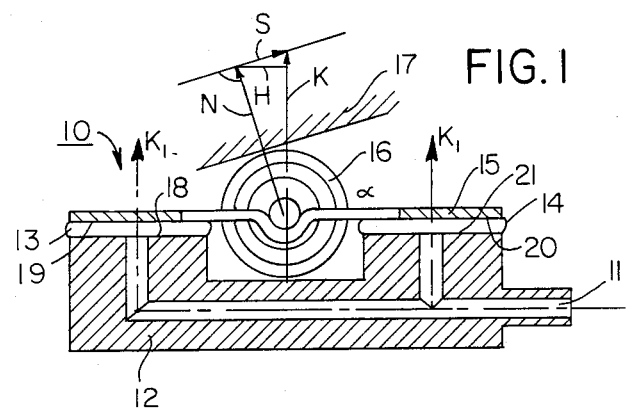
FIG. 1
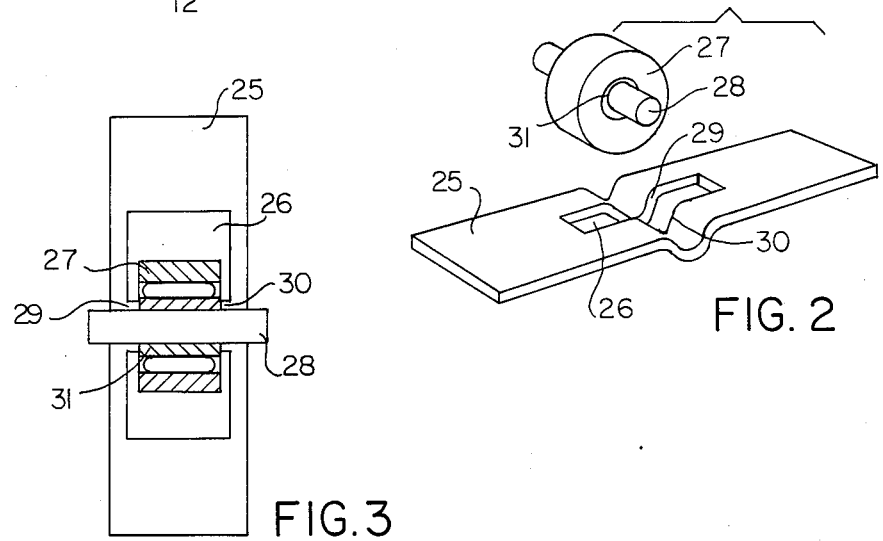
FIG. 2
FIG. 3
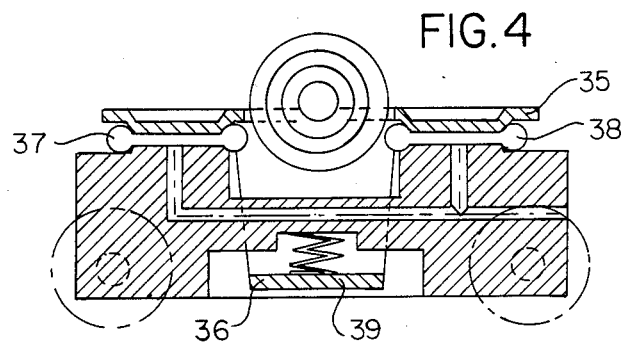
FIG. 4

DRIVE DEVICE OPERATED BY A PRESSURE FLUID

The present invention relates to a drive device, operated by pressure fluid, for producing a relative movement in the form of a progressive, linear, planar or three-dimensional swinging or turning movement of a driven element by means of at least one lifting element.

DESCRIPTION OF THE PRIOR ART

A linear drive device operated by pressure fluid for producing a relative displacement between a carriage-shaped drive unit and a curved-profile push strip is known. In that case, the drive unit has a plurality of piston-cylinder systems which are actuatable by pressure fluid and form step elements, the pistons of said systems resting against the profile of the push strip and the cylinders thereof being each connected via control valve means with the source of pressure fluid, each of the step elements forming, together with lever means pivoted, on the one hand, to the pistons of the step elements and, on the other hand, to the carriage housing, self-centering push-link drive elements.

This device can only be used if the driven object permits form-locked connection to the drive. This represents a very limiting and costly constraint on the external shape of this object.

SUMMARY OF THE INVENTION

The object of the present invention is to create a drive device which does not require this limitation and which permits a force-locked connection.

The drive device operated by pressure fluid in accordance with the invention is characterized by the fact that between the lifting element and the driven element there is at least one part which carries out a stepwise reciprocating motion under the influence of a lifting element in order to push the driven element forward stepwise via a force-locking in the loaded stepping direction.

BRIEF DESCRIPTION OF DRAWINGS

The subject matter of the invention will be explained below with reference to the figures, in which:

FIG. 1 is a longitudinal cross-section of a drive device according to the inflation with simultaneously inflatable, bellows-like force cells for short stroke;

FIG. 2 is a perspective view of a pressure plate with an opening to receive a roller for use in the device of FIG. 1;

FIG. 3 is a partial cross-section of the pressure plate of FIG. 2 with pressure roller mounted, seen from above;

FIG. 4 is a longitudinal cross-section of an alternative drive device with yoke-shaped attachment;

DESCRIPTION OF THE PREFERRED EMBODIMENTS

Figure 5:
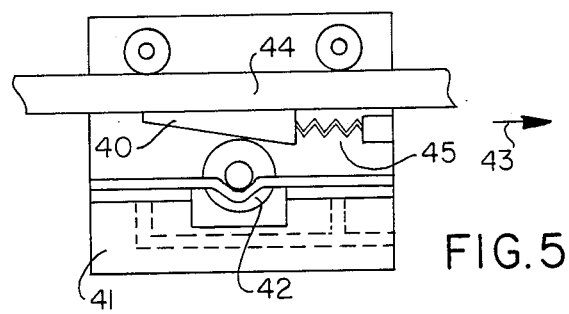
FIG. 5 is a side view of the drive of a wedge-shaped part.

FIG. 1 shows a drive unit 10 with bellows-like force cells 13 and 14 which are simultaneously inflatable through a conduit 11 in a base part 12, and a plate 15 resting on said cells. A cam roller 16 which is mounted with a low friction mounting, such as ball bearings or roller bearings, flat bearings, transmits force from the force cells filled via the force conduit 11 with pneumatic or hydraulic pressure fluid to a driven intermediate part 17, for instance a wedge. The individual parts can, in case of small dimensions, be held together by double-sided adhesive foils on the contact surfaces 18, 19, 20, 21 of the force cells, which surfaces always remain flattened. When the two force cells 13 and 14 are fed via the conduit 11 with a pressure fluid, for instance compressed air, a force $k_1$ is exerted in each case via the cells on the plate 15. This results in an active resultant $k_o = 2 \cdot k_1$ at the axis 28.

If the inclination to the horizontal of the surface of the part 17 at the resting surface of the cam roller 16 is $\alpha$ and if $k_o$ is broken down into the two components N and S, we then have $N = \kappa_o \cdot \cos \alpha$; $S = \kappa_o \cdot \sin \alpha$.

Since the part 17 slides, analogous to the wedge 40 in FIG. 5, on a horizontal plane, only the component H is active for its displacement.

We have:

$$H = S \cdot \cos \alpha = \kappa_o \cdot \sin \alpha \cdot \cos \alpha = (\kappa_o/2) \cdot \sin 2\alpha.$$

By positioning the cam roller 16 a small distance from the resting plane of the two force cells 13, 14, tilting of the plate 15 is prevented.

FIGS. 2 and 3 show details of a plate 25 having an opening 26 for a roller 27, in the form of a roller bearing, which here bears a shaft 28 which is already put in place and protrudes on both sides. Points 29, 30 of the plate opening, which are narrowed to a slight undersize in relation to the other parts of opening 26, effect the clamping of a roller inner ring 31, whereby plate and roller after assembly form a single unit. The embodiment shown shows the possibility of manufacturing such drive elements at small expense with small dimensions—for instance for setting and control movements.

FIG. 4 shows a variant embodiment of the drive element similar to the embodiment of FIG. 1, having a yoke-shaped attachment 35, a pressure plate 36 which makes it possible to install for the return a spring 39 which acts against two force cells 37, 38. It is also possible in similar manner to provide a force cell for return, a signal transmitter for the report of the return of the lift movement or a control device for the follow-up control of other drive elements. Furthermore, two rollers are indicated which make it possible to support the forces of reaction or else a self-propelled embodiment.

FIG. 5 shows the drive of a wedge 40, actuated by a drive element 41. By the application force of a roller 42 there is produced on the wedge 40 a thrust force 43 which corresponds to its angle of inclination. The value of this force is calculated with respect to FIG. 1. By the adherent application or force-locking of the wedge 40 to a push rod 44 the same thrust force is transmitted to the push rod and the latter is displaced by a distance corresponding to the stroke of the roller and the wedge angle. Upon the relaxation of the two force cells, the wedge 40 is moved by a spring 45 back into its starting position in the direction opposite the direction 43. Such a device can displace a push rod with a smooth surface stepwise via frictional locking of the wedge or move itself forward on a stationary straight or planar or three-dimensionally curved rod.

Figure 6:
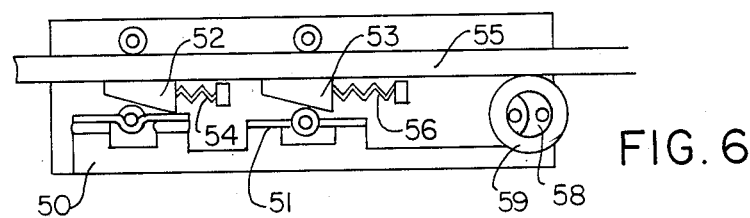
FIG. 6 is a side view of a push drive for continuous advance.

FIG. 6 shows a thrust drive similar to FIG. 5 for a continuous advance. Two drive elements 50 and 51 are each provided with a wedge 52 and 53 respectively mounted thereon and displaceable. Each of these two wedges adheres to the surface of the push rod 55 by force-locking during the actuating time of the respective individual drive element and the two wedges thus displace the push rod 55 alternately. In the relaxation phases, the wedges 53 and 54 are pushed back into their initial positions by springs 54 and 56. These advancing elements with the moved wedges can be controlled by alternating individual pneumatic pulses or via valves. A rotary slide control 58, for instance, driven by a friction wheel 59, as is diagrammatically indicated, makes possible continuous control.

Figure 7:
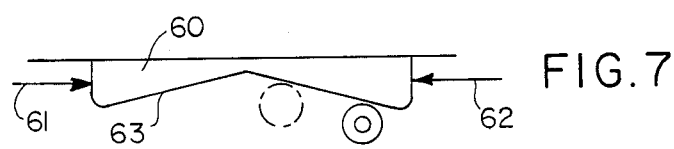
FIG. 7 is a side view of a double wedge for a wedge thrust drive.

FIG. 7 shows a wedge 60 of a wedge thrust drive similar to that of FIG. 5 or 6, but for switchable thrust directions 61, 62. This can be effected by the switching of a bistable spring system (not shown). The greatest possible angle of the wedge surface 63, which may be flat or curved, is determined by the value of the coefficient of friction between a push rod and the wedge surface it rests against, for the increase of which a friction covering of customary type can be used, if necessary.

All the drive elements shown above can be used for linear and flat or three-dimensional swinging and turning drives. The pulse actuation of the drive elements makes a stepwise drive possible. All of these movements are to be considered relative movements.

Figure 8:
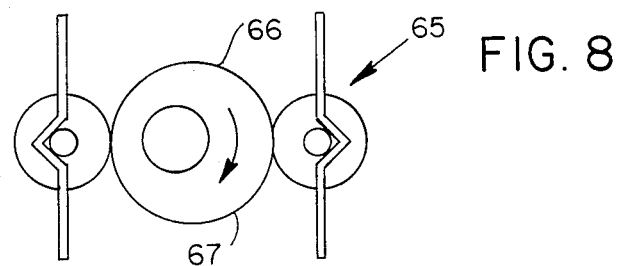
FIG. 8 is an end view of a cam drive.

FIG. 8 shows diagrammatically a cam drive 65 for continuous rotation in one direction of rotation with a drive curve $66 > 180°$ and a return curve $67 < 180°$. Such an unequal division of the curve parts, which makes continuous rotation possible, can also be multiply employed, whereby the speed of rotation or number of steps per revolution is changed.

Figure 9:
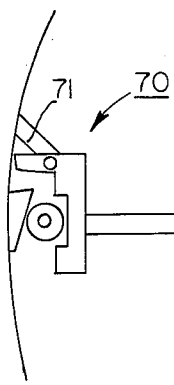
FIG. 9 is a side view of a wedge thrust drive for producing a moment of rotation.

FIG. 9 shows a wedge thrust drive 70, similar to that of FIG. 5, 6 or 7, for the producing of a moment of rotation, for instance for the drive of railway turning platforms or in connection with agitators in clarification plants. A locking pawl 71 prevents backward movement.

Figure 10:
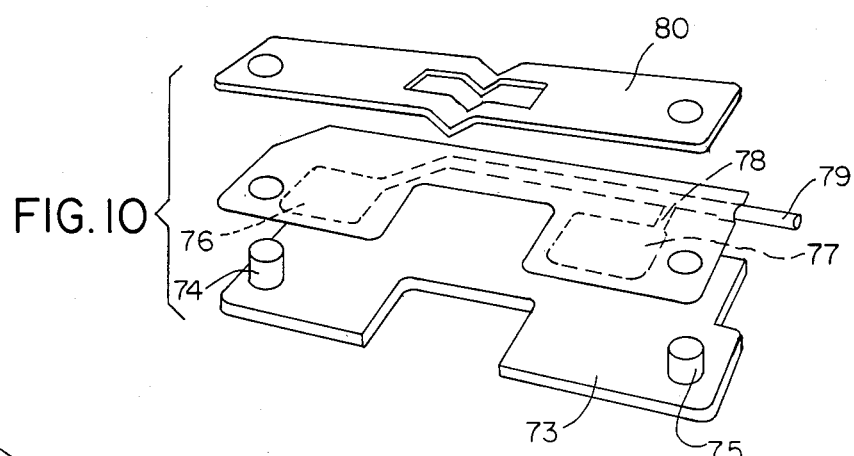
FIG. 10 is an exploded perspective view of a drive element with guide pins.

FIG. 10 shows a drive element having a base part 73 stamped, for instance, from sheet metal, which is provided with guide pins 74 and 75. A, force-cell part, made for instance, by vulcanizing or high-frequency-welding, has two force cells 76, 77, feed channels 78, and a connection 79. A pressure-plate part 80 is guided on force cells 76, 77.

Figure 11:
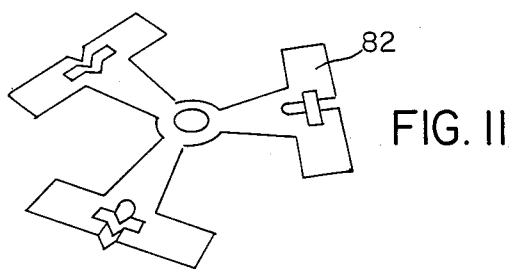
FIG. 11 is a perspective view of a planar arrangement of several drive elements.

For a planar arrangement of several drive elements for the driving of axially arranged curved paths, the functional parts of the functional planes such as base part, force cells and pressure plates can be combined. An example of a multiple pressure plate 82 with radial and possibly also spring connections is shown in FIG. 11.

Figure 12:
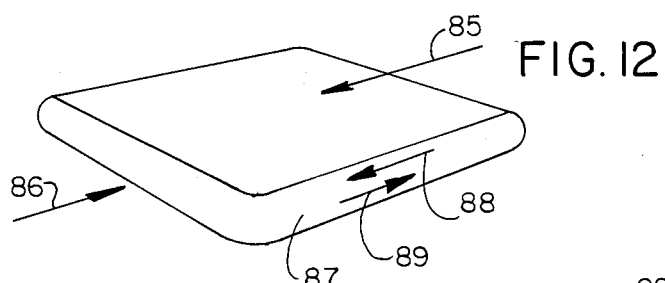
FIG. 12 is a perspective view of a parallelepiped-shaped force cell.

In order that both the tangential forces and the thrust forces of a drive are, in principle, taken up only by the force cell itself, it is advantageous to select for the force cell (FIG. 12) a membrane or bellows shape which has side walls 87 which lie parallel to the direction of the thrust forces 85 and 86 and are at least approximately cylindrical. Such properties are enjoyed, for instance, by force cells of rectangular shape which receive the thrust forces 85, 86 produced in the fastening surfaces as thrust tension 88, 89 in the wall of the sheet.

Insofar as sufficient dimensioning of the wall of the sheet for such self-guidance is not possible or guidance is required also in pressure-less condition, external guide parts, for instance links or some other type of guidance, must be provided.

Figure 13:
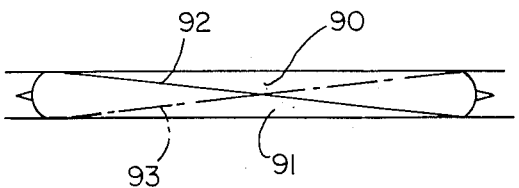
FIG. 13 is a cross-sectional view showing the internal guidance of a membrane-like or bellows-like force cell.

The internal guidance of a membrane-like or bellows-like force cell, such as shown, for instance, in FIG. 13, can be developed by an elastic, resilient or articulated connection 92 of similar or somewhat more elastic material which is fastened diagonally between the adherent walls 90 and 91. With sufficient stretchability of the diagonal connecting part and with relatively small height of lift, for instance, one-tenth of the narrower side, a connecting part 93 which acts in the opposite direction can also, in addition, be installed. It is also possible to install mechanical guide parts, such as a centering bolt, into the force cell.

Figure 14:
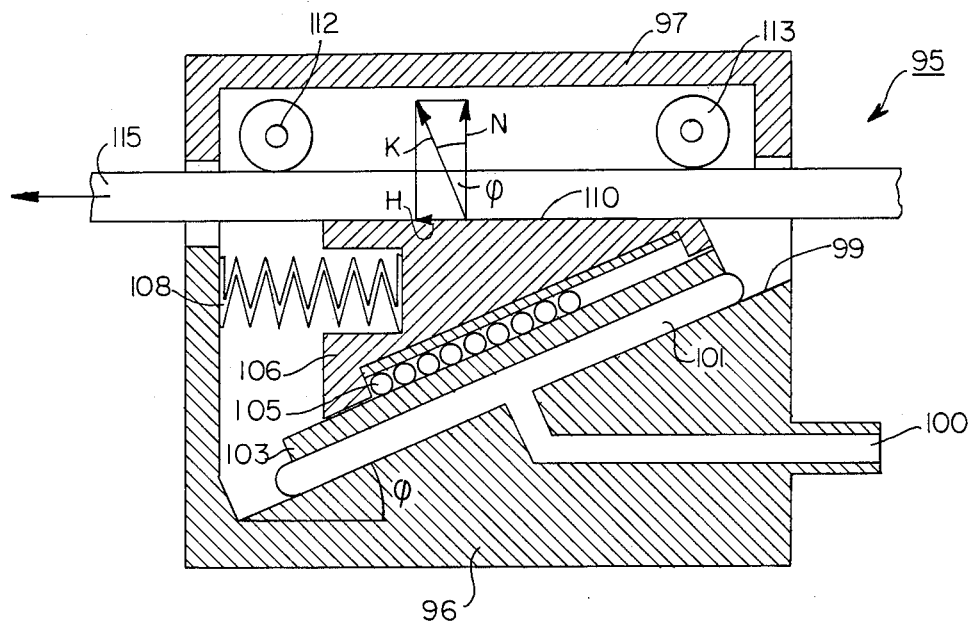
FIG. 14 is a longitudinal cross-sectional view of a cell with needle bearing lying parallel to the wedge plane.

FIG. 14 shows diagrammatically a longitudinal section through a drive device 95. It has a housing 96 with a cover 97, the housing 96 having an inner, oblique resting surface 99 on which a force cell 101 is fastened, for instance by adhesive. Via a compressed air connection 100 the operating fluid is fed to the force cell 101. On the force cell 101 there rests a plate 103 which forms the outer part of a flat-needle cage bearing 105, which bearing 105 is otherwise arranged in a slide wedge 106, as can be seen. The slide wedge 106 is provided with a return spring 108 and with a displacement surface 110 which has a corresponding "roughness" or capability of adherence in order to grasp in force-locked manner the object to be conveyed, in the present case a rod 115 or, in the case of suitable transverse extent, a plate. Opposite the adherence surface or displacement surface 110 there are two rollers 112 and 113 which are mounted for rotation in the cover 97.

When the force cell 101 is supplied with compressed air through the connection 100, it exerts on the thrust wedge 106 a force K acting perpendicular to the oblique surface of the wedge, the component $H = k \cdot \sin \phi$ of which pushes the slide wedge 106 to the left in FIG. 14 and, by the normal component $N = k \cdot \cos \phi$ grasps the rod or plate 115 in force-locked manner. By this displacement movement the rod 115 is moved stepwise to the left since after the force cell 101 loses pressure the return spring 108 pushes the slide wedge 106 back into its right-hand starting position.

If several such drive devices 95 are connected one behind the other then, with suitable control, continuous displacement of the rod or plate 115 is possible.

Figure 15:
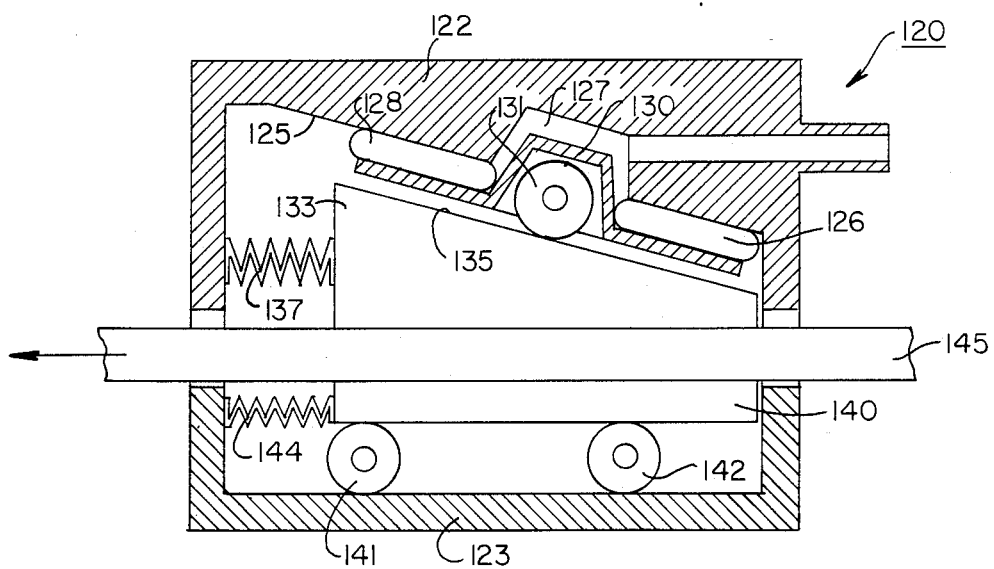
FIG. 15 is a longitudinal cross-sectional view of a drive device with clamping parts arranged in the manner of tongs.

FIG. 15 shows a somewhat different embodiment of a drive device 120 in a view similar to FIG. 14. A cover 123 is seated on a housing 122. The housing 122 has an inner oblique surface 125, 126 as well as a depression 127. The force cell 128 has a recess which corresponds to this depression. On this oblique surface there is mounted very low—as a result of the recess—a correspondingly shaped plate 130 which serves to receive a push roller 131. In case of a suitable width of the drive device 120, the push roller 131 can be shaped as a roller. A slide wedge 133 has a wedge oblique surface 135 which is in contact with the push roller 131. The slide wedge 133 is provided with a return spring 137 which pushes the wedge back to its starting position after its operation.

Opposite the slide wedge 133 there is a thrust bearing plate 140 which is displaceably mounted on two rollers 141 and 142 or cylinders and is provided with a return spring 144. The material conveyed is a rod 145 or a corresponding plate or else, in general, tensile-resistant or tensile-stiff bodies such as wires, ropes, sheets, etc.

In contradistinction to the manner of operation of the drive device of FIG. 14, in this case the material conveyed in the form of the bar 145 is grasped in tong-like manner by the slide wedge 133 on the one side and by the thrust bearing plate 140 on the other side. In this way the force-locking displacement surface of the drive device is correspondingly increased. This device is very particularly suitable for conveying objects which cannot be acted on by pressure for moving them along as in the case of wires, ropes, cables, etc. The wedge support can also be structured in accordance with FIG. 14.

These devices are suitable for any desired forms of material which are dimensionally rigid in one direction. They can also be used as so-called climbing monkeys and the like.

With such a device it is furthermore possible to convert on electric pulse which is, for instance, square or sinusoidal into a corresponding mechanical impulse.

Instead of antifriction bearings self-lubricating plain bearings can also be used. All of these statements and showings are essential to the invention.

The illustrations of FIGS. 14 and 15 indicate embodiments in which, by vertical lifting to the wedge surface of the force producers, the latter in principle need not bear any shear stressing, for which reason they also make possible the use of roller membranes or other force-generating elements with less self-guidance.

I claim:

1. A step motion drive device operating by fluid pressure which provides relative unidirectional stepping movement between the device and a driven element, comprising at least one fluid-actuated expansible member, a force transmitting member which is displaced by said expansible member, a linearly displaceable direction-translating member in the form of a wedge through which said force transmitting member operates, and means for biasing the wedge in the opposite direction of said stepping movement, whereby said wedge is non-positively connected to said driven member and expansion and contraction by said expansible member due to fluctuations in said fluid pressure causes reciprocal linear displacement of the force transmitting member and a corresponding reciprocal movement of the wedge, the latter causing a step-wise unidirectional displacement of the driven member by means of a frictional non-positive connection therewith.

2. A drive device according to claim 1 wherein the expansible member is a flexible membrane forming an enclosed member.

3. A drive device according to claim 2 wherein said membrane is reinforced diagonally in the longitudinal direction.

4. A drive device according to claim 1 wherein the expansible member is a bellows.

5. A drive device according to claim 1 wherein the force transmitting member comprises a rotatable roller supported in a translatable plate, and said expansible member is positioned in between said translatable plate and a base plate.

6. A drive device according to claim 1 wherein there are two spaced apart expansible members and said force transmitting member includes a plate supported at each end on a respective one of the expansible members.

7. A drive device according to claim 1 wherein the force transmitting member comprises a flat needle cage bearing having a plurality of needles (or rollers).

8. A drive device according to claim 1 wherein the force transmitting member acts along a line perpendicular to the opposing surface of the wedge.

9. A drive device according to claim 1 wherein the wedge comprises a member having two camming surfaces symmetrically inclined from a central axis and wherein the force transmitting member selectively acts against one or other of said inclined surfaces, there being a switchable bistable spring system acting on said member.

10. A drive according to claim 1 including a housing slidably containing a portion of said driven member, said housing further containing said at least one expansible member, said force transmitting member and said direction-translating member.

11. A drive device according to claim 10 wherein said housing is suspended on rollers from said driven member.

12. A drive device according to claim 10 further comprising a reaction plate supported within the housing on rollers, and wherein the said portion of the driven member is positioned between the reaction plate and the said wedge.

13. A drive arrangement comprising two or more drive devices according to claim 1 having the same driven element and means for sequentially supplying fluid pressure to each of the devices so that continuous movement of the driven member is obtained.

* * * * *